(12) United States Patent
Chou

(10) Patent No.: US 7,025,343 B2
(45) Date of Patent: Apr. 11, 2006

(54) ADJUSTING METHOD AND ADJUSTING MECHANISM FOR REMEDYING THE COIL PITCH TOLERANCE AND FATIGUE DEFORMATION OF ADJUSTABLE HELICAL SPRING

(76) Inventor: Cheng-Ming Chou, 10/F4, No. 8, Lane 226, Jen-ai Rd., Lin 16, Nanshin Vill, Linkou Hsiang, Taipei hsien (TW)

( * ) Notice: Subject to any disclaimer, the term of this patent is extended or adjusted under 35 U.S.C. 154(b) by 0 days.

(21) Appl. No.: 11/019,268

(22) Filed: Dec. 23, 2004

(65) Prior Publication Data

US 2005/0258582 A1 Nov. 24, 2005

(30) Foreign Application Priority Data

May 19, 2004 (TW) ............................... 93114041 A

(51) Int. Cl.
*F16F 1/06* (2006.01)
*F16F 1/12* (2006.01)

(52) U.S. Cl. ...................... 267/177; 267/175; 267/255

(58) Field of Classification Search ................ 267/177, 267/175, 255, 286–291, 166, 169, 221, 218; 16/DIG. 10, 72
See application file for complete search history.

(56) References Cited

U.S. PATENT DOCUMENTS

| | | | | |
|---|---|---|---|---|
| 1,189,375 A * | 7/1916 | Miller | ......................... | 267/250 |
| 1,309,850 A * | 7/1919 | Home | ......................... | 267/249 |
| 1,811,403 A * | 6/1931 | Mesinger | .................... | 267/290 |
| 2,204,725 A * | 6/1940 | Crites | .......................... | 74/581 |
| 2,995,327 A * | 8/1961 | Wood | ........................... | 248/543 |
| 3,033,590 A * | 5/1962 | Statler | ..................... | 280/6.159 |
| 3,041,060 A * | 6/1962 | Jacobsen | .................... | 267/177 |
| 3,163,195 A * | 12/1964 | Croswell | .................... | 411/303 |
| 3,181,852 A * | 5/1965 | Paller | ........................ | 267/218 |
| 3,399,879 A * | 9/1968 | Takeshi et al. | ............. | 267/178 |
| 3,613,520 A * | 10/1971 | Worden | ........................ | 92/133 |
| 4,613,119 A * | 9/1986 | Hardtke | ..................... | 267/172 |
| 4,634,109 A * | 1/1987 | Cigolotti et al. | ............ | 267/170 |
| 4,653,736 A * | 3/1987 | Pontoppidan | ................ | 267/70 |
| 4,686,739 A * | 8/1987 | Fritsche et al. | ................ | 16/79 |
| 4,760,621 A * | 8/1988 | Stromquist | .................... | 16/85 |
| 4,783,882 A * | 11/1988 | Frolov | ............................ | 16/72 |
| 4,832,321 A * | 5/1989 | Aardema | .................... | 267/287 |
| 4,894,883 A * | 1/1990 | Fleischhauer | .................. | 16/66 |
| 5,553,836 A * | 9/1996 | Ericson | ..................... | 267/286 |
| 6,564,667 B1* | 5/2003 | Bayer et al. | ............. | 74/490.01 |
| 6,676,118 B1* | 1/2004 | Chou | .......................... | 267/177 |
| 2004/0195745 A1* | 10/2004 | Oliver et al. | ............... | 267/221 |

* cited by examiner

*Primary Examiner*—Robert A. Siconolfi
(74) *Attorney, Agent, or Firm*—Birch, Stewart, Kolasch & Birch, LLP

(57) ABSTRACT

In an adjusting method for remedying the coil pitch tolerance and fatigue deformation of an adjustable helical spring, an adjusting mechanism is mounted at one end of the casing for the adjustable helical spring for changing the precompression or the pretension of the helical spring to thereby remedy the coil pitch tolerance and fatigue deformation thereof, and rotating a rotatable element mounted in the casing and connected to one end of the helical spring, so that the helical spring is adjusted to a preset number of effective turns, and then the precompression or the pretension of the helical spring is adjusted. The adjusting method not only solves the problem of coil pitch tolerance and fatigue deformation existed in the adjustable helical spring, but also reduces noises produced by the adjustable helical spring in use.

13 Claims, 8 Drawing Sheets

ADJUSTING METHOD AND ADJUSTING MECHANISM FOR REMEDYING THE COIL PITCH TOLERANCE AND FATIGUE DEFORMATION OF ADJUSTABLE HELICAL SPRING

BACKGROUND OF THE INVENTION

1. Field of the Invention

The present invention relates to an adjusting method and adjusting mechanism for remedying the coil pitch tolerance and fatigue deformation of an adjustable helical spring, and more specifically to an adjusting method for remedying the coil pitch tolerance and fatigue deformation of an adjustable helical spring used in a shock absorber.

2. Description of the Related Art

A conventional spring has an elastic coefficient determined at the time of production, and is therefore not always useable for different types of machines. As a result, different helical springs must be designed for different machines or different purposes, and it is uneconomical to do so.

To overcome the above shortcomings, the same inventor of the present invention has invented a casing for adjustable helical spring, which was published under Taiwanese Patent Publication No. 436588 on May 28, 2001. The casing for adjustable helical spring disclosed in Taiwanese Patent Publication No. 436588 comprises a male and a female case, and a rotatable element to enable adjustment of the helical spring to different elastic coefficients to meet the requirement of different machines. The helical spring has an end fixedly connected to a seat at a bottom center of the female case, and another opposite end located in the male case. The rotatable element is provided on an external or an internal surface with a plurality of stoppers to contact with coils of the helical spring. When the rotatable element is turned, the number of effective coils of the helical spring subjected to compressive force or tension force is changed to thereby adjust the elastic coefficient of the helical spring corresponding to actual need. With the casing for adjustable helical spring disclosed in Taiwanese Patent Publication No. 436588, the helical spring is more practical for use, and the problems existed in the conventional helical springs could be effectively solved.

While the casing for the adjustable helical spring disclosed in Taiwanese Patent Publication No. 436588 is able to solve the problem existed in the conventional helical springs, it fails to overcome another common problem in the helical springs, that is, the fatigue and deformation of the helical spring caused by using the helical spring over a prolonged time or overusing the helical spring. So, it is desirable to develop a method and mechanism to effectively solve the above problem to reduce the rate of replacement of the adjustable helical spring.

SUMMARY OF THE INVENTION

A primary object of the present invention is to provide an adjusting method for remedying the coil pitch tolerance and fatigue deformation of an adjustable helical spring. In implementing the adjusting method, an adjusting mechanism is mounted at one end of the casing of the adjustable helical spring to effectively turn the rotatable element in the casing, so as to solve the problems caused by the coil pitch tolerance and fatigue deformation of the adjustable helical spring, obtain a preset number of effective turns of the helical spring, and reduce noises produced by the adjustable helical spring in use.

Another object of the present invention is to provide an adjusting method for remedying the coil pitch tolerance and fatigue deformation of an adjustable helical spring that could be employed on all kinds of casing for the adjustable helical spring, including adjustable compression and tension helical springs.

A further object of the present invention is provide an adjusting method for remedying the coil pitch tolerance and fatigue deformation of an adjustable helical spring, so as to prolong the service span of the adjustable helical spring and to reduce the rate of failure of machines using helical springs.

To achieve the above and other objects, the adjusting method of the present invention includes the steps of mounting an adjusting mechanism to one end of the casing of the adjustable helical spring and connecting the helical spring to the adjusting mechanism; changing the precompression or pretension of the helical spring to thereby remedy the coil pitch tolerance and fatigue deformation thereof, so that the helical spring is recovered to a coil pitch the same as that of the rotatable element; leaving a small clearance between the stoppers of the rotatable element and the spring coils, against which the stoppers press; rotating the rotatable element, which is mounted in the casing and connected to one end of the helical spring, so that the helical spring is adjusted to a preset number of effective turns; and then adjusting the precompression or pretension of the helical spring.

During the process of fabricating the helical spring, each coil pitch inevitably has an allowable tolerance. When the adjustable helical spring has been used for a long time, it is subjected to deformation due to elastic fatigue thereof, and accordingly changed coil pitch that has an increased range of tolerance. However, the pitch of the rotatable element remains unchanged. In other words, when the rotatable element is rotated by one turn, a distance of the axial displacement thereof is the same. To ensure that the rotatable element may be effectively rotated without being adversely affected by the coil pitch tolerance or the fatigue deformation, the adjusting mechanism is therefore mounted at one end of the casing of the adjustable helical spring and set to an initial state. In the initial state, a small clearance is left at the location at where the stoppers of the rotatable element is pressed against the spring coils, so that the spring coils are separated from the rotatable element, enabling a maximum adjusting range for the precompression or the pretension of the helical spring, and a maximum adjusting range for the number of effective turns of the helical spring.

The steps for adjusting the number of effective turns of the adjustable helical spring are as follows:

Step 1: changing the precompression or pretension of said helical spring using said adjusting mechanism, so that said helical spring is recovered to a coil pitch the same as that of said rotatable element (i.e., a preset coil pitch), and said stoppers on said rotatable element and said spring coils are separated from one another at where the stoppers of the rotatable element press against the spring coils with a small clearance left between them;

Step 2: turning the rotatable element to obtain the number of effective turns preset for the helical spring; and return to Step 1 in case the stoppers of the rotatable element are in contact with the spring coils to prevent the rotatable element from rotating effectively; and Step 3: using the adjusting mechanism to increase the precompression or pretension of the adjustable helical spring, causing the stoppers of the rotatable element to closely press against the spring coils of the helical spring.

BRIEF DESCRIPTIONS OF THE DRAWINGS

Figure 4:
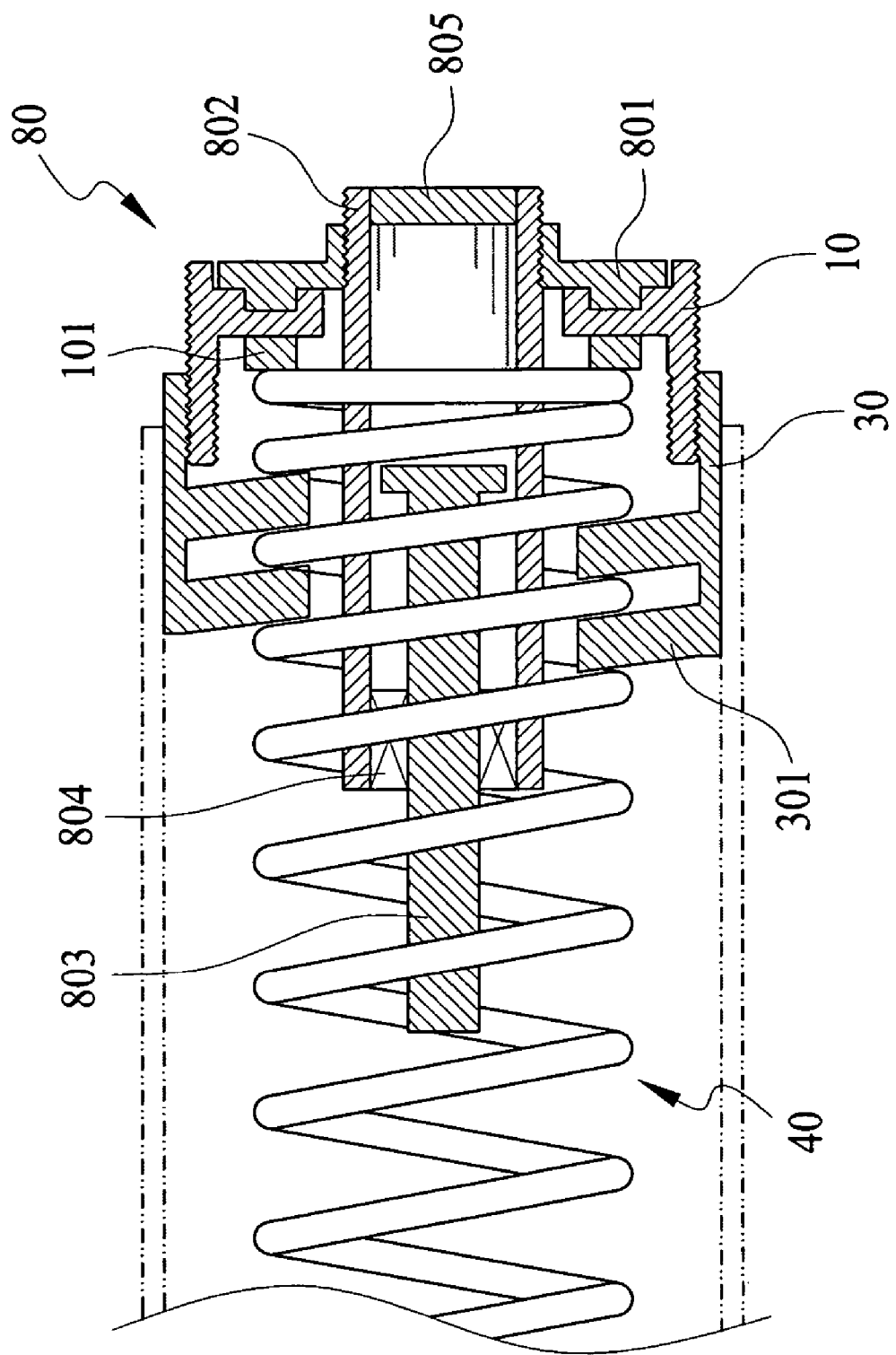
FIG. 4 is an assembled sectional view of an adjusting mechanism for remedying the coil pitch tolerance and fatigue deformation of an adjustable helical spring according to a second embodiment of the present invention, wherein the adjusting mechanism is mounted at an end of a male case of a casing for an adjustable helical spring and works with an internally grooved rotation member.
Figure 7:
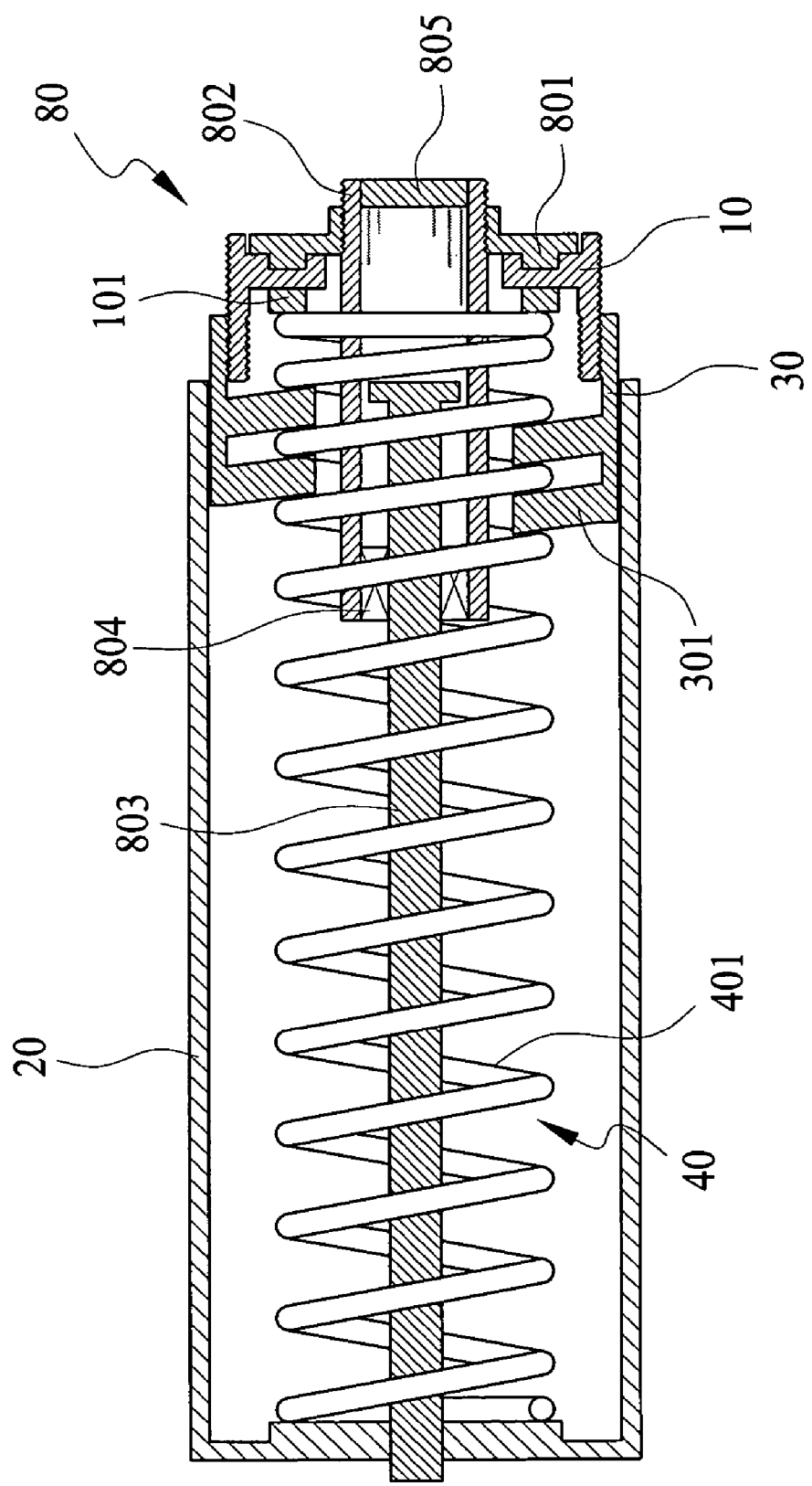
Figure 8:
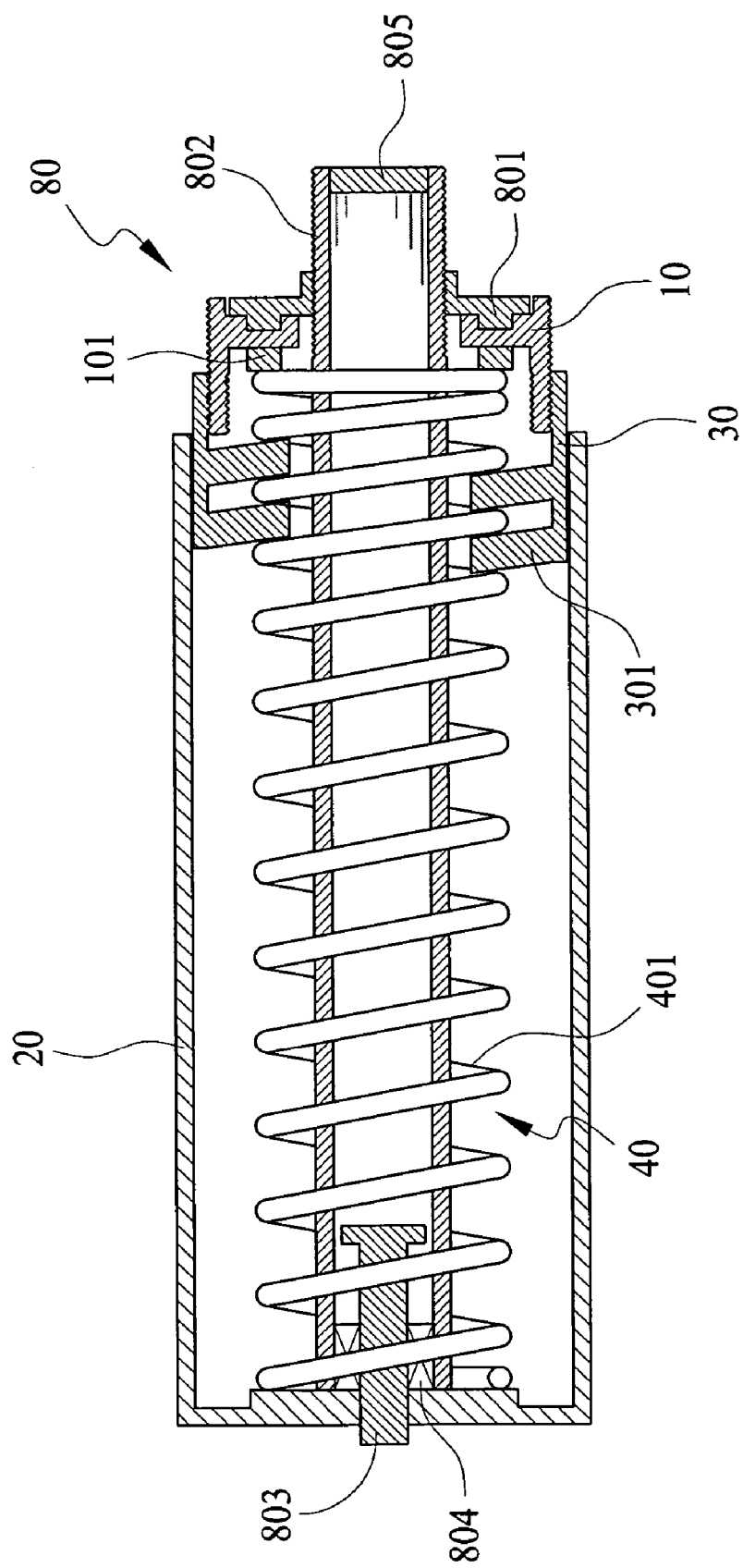

FIG. 7 shows the manner of using the adjusting mechanism of FIG. 4 to adjust an adjustable compression helical spring mounted in a male case having an outer diameter smaller than an inner diameter of a female case of the casing for the adjustable helical spring; and FIG. 8 shows the manner of using the adjusting mechanism of FIG. 4 to adjust an adjustable tension helical spring mounted in a male case having an outer diameter smaller than an inner diameter of a female case of the casing for the adjustable helical spring.

DETAILED DESCRIPTION OF THE PREFERRED EMBODIMENTS

Figure 1:
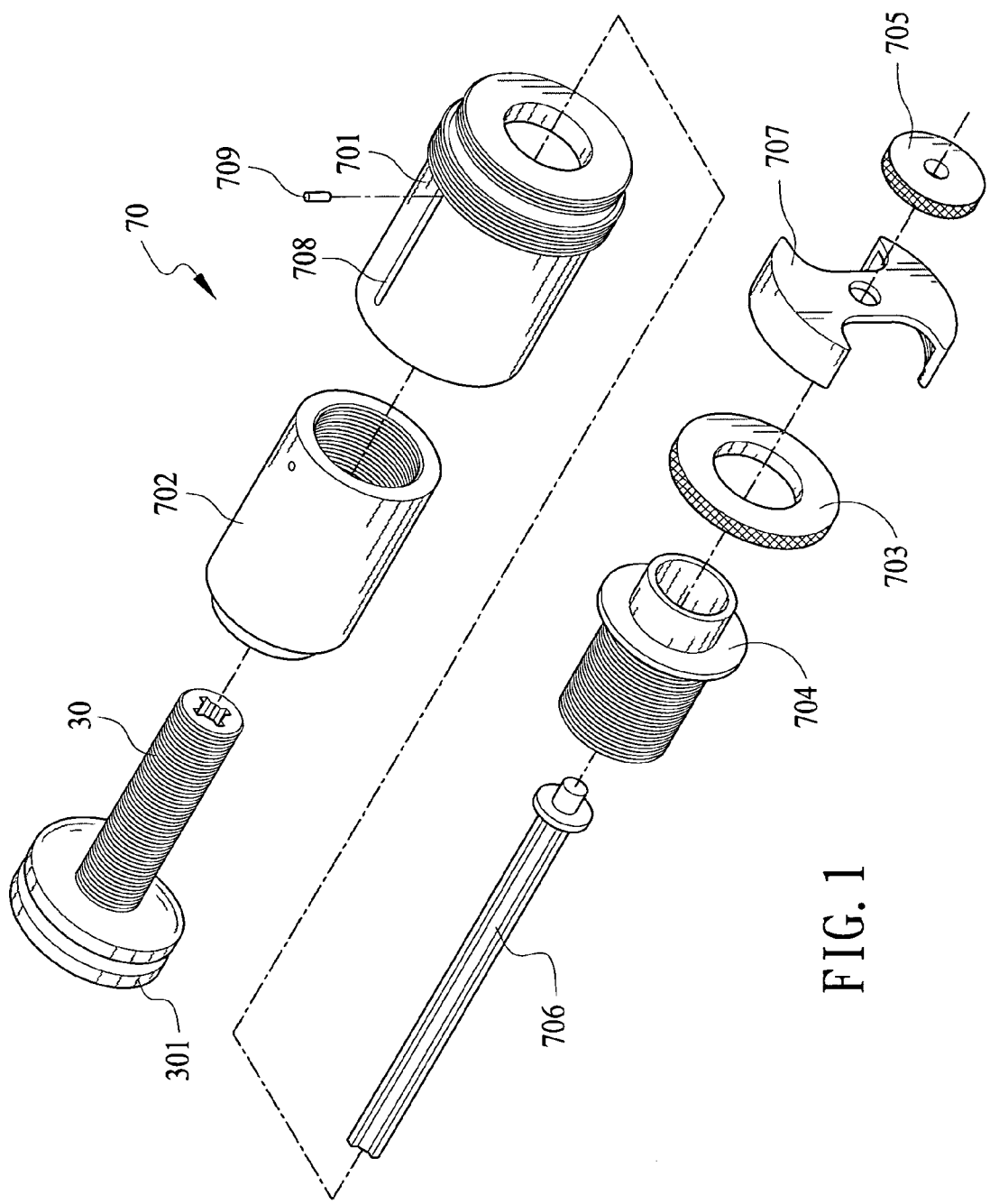
FIG. 1 is an exploded perspective view of an adjusting mechanism for remedying the coil pitch tolerance and fatigue deformation of an adjustable helical spring according to a first embodiment of the present invention, wherein the adjusting mechanism is mounted at an end of a male case of a casing for an adjustable helical spring and works with an externally grooved rotation member.
Figure 2:
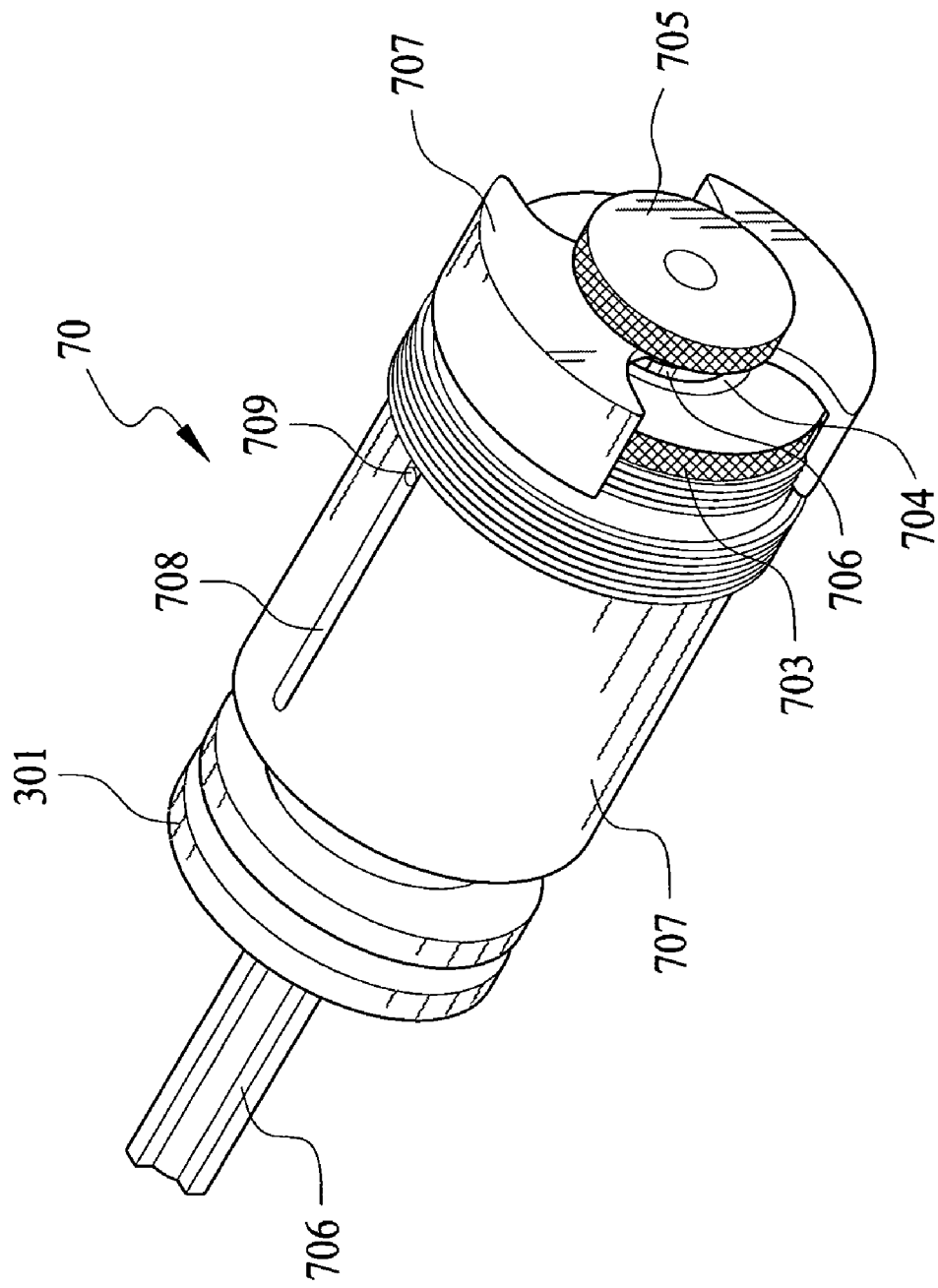
FIG. 2 is an assembled view of FIG. 1.
Figure 3:
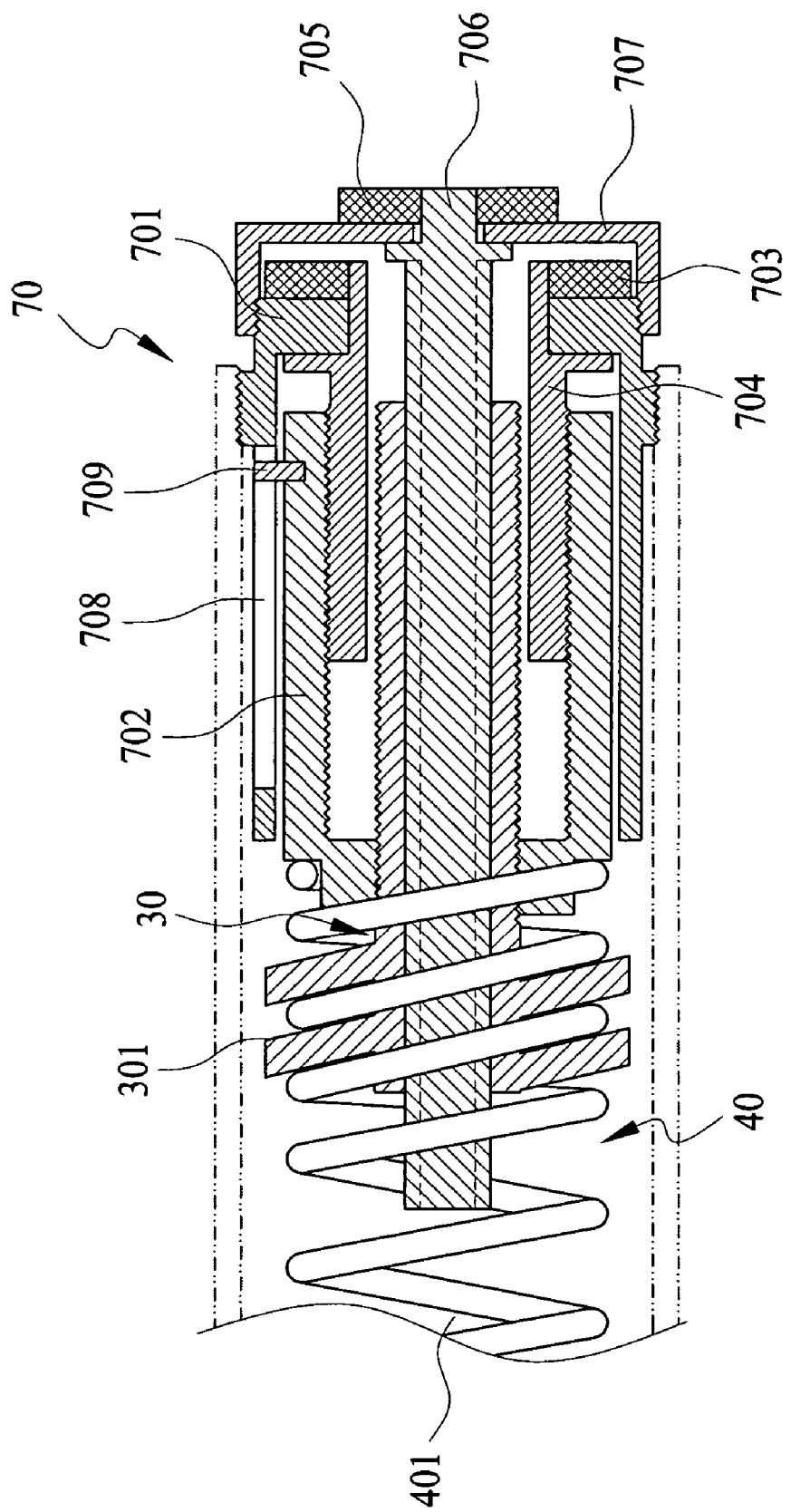
FIG. 3 is an assembled sectional view of FIG. 1.

FIGS. 1, 2 and 3 are exploded and assembled perspective views, and assembled sectional view of an adjusting mechanism 70 for remedying the coil pitch tolerance and fatigue deformation of an adjustable helical spring according to a first embodiment of the present invention. As shown, the adjusting mechanism 70 according to the first embodiment of the present invention includes a fixing case 701, a preset barrel 702, a turning knob 703, a drive cylinder 704, a rotator knob 705, a drive shaft 706, and a spacer 707, and is mounted at an end of a male case of a casing for an adjustable helical spring 40 to work with an externally grooved rotatable element 30 having a plurality of stoppers 301 provided around an outer surface thereof.

The fixing case 701 is a hollow case having a central hole formed at a bottom end. The bottom central hole has an inner diameter smaller than that of a front end of the fixing case 701 opposite to the bottom end. The fixing case 701 is provided at a predetermined position near the bottom central hole with first external threads to mesh with internal threads provided in an open end of the male case of the adjustable helical spring 40, so as to fixedly connect the whole adjusting mechanism 70 to the casing of said adjustable helical spring 40. The fixing case 701 is provided with an axial slot 708 of a predetermined length. The axial slot 708 has a bottom end close to the bottom end of the fixing case 701, and a front end opposite to the bottom end. The fixing case 701 is also provided around the bottom end with second external threads to mesh with internal threads on the spacer 707.

The preset barrel 702 is a hollow member with internal threads provided in a first end thereof to mesh with external threads provided on the drive cylinder 704, and in an opposite second end to mesh with external threads on the rotatable element 30. The helical spring 40 is connected at an end to an outer peripheral surface of the second end of the preset barrel 702, so as to fixedly connect the helical spring 40 to the adjusting mechanism 70.

The retaining key 709 is mounted at a predetermined position on the outer peripheral surface of the preset barrel 702 and guided by the slot 708 on the fixing case 701 to axially move the preset barrel 702.

The drive cylinder 704 is also a hollow member with a first end extended through the bottom central hole of the fixing case 701 to tightly engage with the turning knob 703, and an opposite second end provided with external threads to mesh with the internal threads in the first end of the preset barrel 702.

The turning knob 703 is manually operable for adjusting precompression or pretension of the helical spring 40, and is located at an outer side of the bottom central hole of the fixing case 701 to tightly engage with the drive cylinder 704. The turning knob 703 is smoothly turnable relative to the fixing case 701 to rotate the drive cylinder 704. The drive cylinder 704 rotated by the turning knob 703 and the retaining key 709 mounted on the preset barrel 702 and guided by the slot 708 on the fixing case 701 together cause the preset barrel 702 to move axially.

The spacer 707 is an internally threaded hollow member screwed to the second external threads of the fixing case 701.

The drive shaft 706 has a first end extended through the bottom central hole of the fixing case 701 and a central hole on the spacer 707 to tightly engage with the rotator knob 705, and an opposite second end having axially extended drive keys spaced on an outer surface thereof to slidably fit in an axial keyway provided on the rotatable element 30.

The rotator knob 705 is manually turnable for adjusting the number of effective turns of the helical spring 40, and is located at an outer side of the spacer 707 to tightly engage with the first end of the drive shaft 706. The rotator knob 705 is smoothly turnable relative to the spacer 707 to rotate the drive shaft 706 and, accordingly, the rotatable element 30, which is connected to the drive shaft 706 via engagement of the axial keyway on the rotatable element 30 with the axial drive keys on the drive shaft 706. And, the rotatable element 30 is brought to turn and axially move at the same time due to the retaining key 709 on the preset barrel 702 and the engagement of the external threads on the rotatable element 30 with the internal threads in the second end of the preset barrel 702.

FIG. 4 is an assembled sectional view of an adjusting mechanism 80 for remedying the coil pitch tolerance and fatigue deformation of an adjustable helical spring 40 according to a second embodiment of the present invention, wherein the adjusting mechanism 80 is mounted at an end of a male case 10 of the casing for the adjustable helical spring 40 to work with an internally grooved rotation member 30. The internally grooved rotatable element 30 has a plurality of stoppers 301 formed on an inner wall surface thereof. The adjusting mechanism 80 includes a preset turning knob 801, an outer extractable tube 802, an inner extractable tube 803, a bearing 804, and a seal cap 805.

The outer extractable tube 802 is a hollow member having an externally threaded first end sealed by the seal cap 805, and an opposite second end having the bearing 804 fixedly mounted therein. The distance between the bearing 804 and the seal cap 805 defines a range within which the inner extractable tube 803 may be axially moved, or a travel of the adjustable helical spring 40, either a compression or a tension helical spring.

The inner extractable tube 803 has a first end fixedly connected to a bottom of a female case 20 of the casing for the adjustable helical spring 40, and an opposite second end slidably extended through the bearing 804 on the outer extractable tube 802, such that the inner extractable tube 803 is axially movable in the outer extractable tube 802.

A spring seat 101 is located in the bottom of male case 10 to fix the helical spring 40 in place.

The preset turning knob 801 has an internally threaded central opening meshing with external threads provided on the first end of the outer extractable tube 802. An end of the preset turning knob 801 is tightly pressed against but smoothly turnable relative to the male case 10. Whereby when the preset turning knob 801 is rotated, the male case 10 is brought to axially move without turning, When the preset turning knob 801 is rotated, both the male case 10 and the rotatable element 30 are axially moved to change the precompression or the pretension of the helical spring 40.

Figure 5:
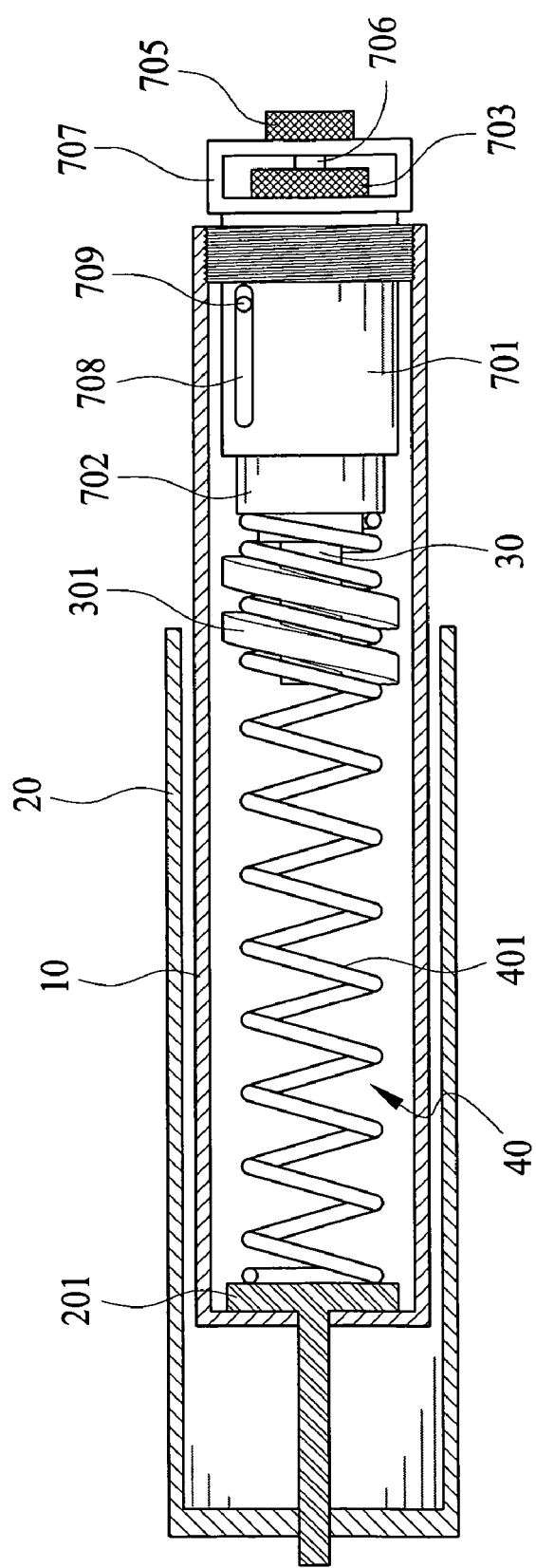
FIG. 5 shows the manner of using the adjusting mechanism of FIG. 1 to adjust an adjustable compression helical spring mounted in a male case having an outer diameter smaller than an inner diameter of a female case of the casing for the adjustable helical spring.

FIG. 5 shows the manner of using the adjusting mechanism 70 of FIG. 1 to work with an externally grooved rotatable element 30 to adjust an adjustable compression helical spring 40 mounted in a male case 10 having an outer diameter smaller than an inner diameter of a female case 20 of the casing for the adjustable helical spring. As shown, a compression stroke of the adjustable compression helical spring 40 is determined by the length of a locating seat 201. When a maximum compression stroke is reached, the male case 10 and the female case 20 will contact with each other at the same end. After the adjustable compression helical spring is assembled, the helical spring 40 is subjected to an initial precompression. This is the initial precompression applied to the male case 10 and the locating seat 201. A coil pitch formed under the initial precompression is an initial coil pitch. A distance difference between the initial coil pitch and a coil pitch not subjected to the initial precompression defines a specific range of the fatigue deformation of the helical spring 40. When the helical spring 40 is subjected to a fatigue deformation within an operating cycle thereof, and it is desired to recover the helical spring 40 to the initial coil pitch, a precompression less than the initial precompression is required. To effectively adjust the number of effective turns of the helical spring 40, the stoppers 301 on the rotatable element 30 and the pitch of the stoppers must be equal to or slightly smaller than the initial coil pitch. In other words, an axial displacement produced by rotating the rotatable element 30 one turn must be equal to or slightly smaller than the initial coil pitch.

The initial state of the adjusting mechanism 70 working with the externally grooved rotatable element 30 is as follows:

1. The retaining key 709 on the preset barrel 702 is located at the bottom end of the slot 708, so that a maximum axial displacement of the preset barrel 702 in the direction of compressing the helical spring 40 may be obtained.

2. The stoppers 301 on the rotatable element 30 is in slight contact with the preset barrel 702, so that a maximum axial displacement of the rotatable element 30 in the direction of compressing the helical spring 40 may be obtained.

3. The stoppers 301 on the rotatable element 30 and the spring coils 401 of the helical spring 40 are separated from one another at where the stoppers 301 are pressed against the spring coils 401, and a small clearance is existed between the stoppers 301 and the spring coils 401.

The adjustable compression helical spring 40 in the initial state has the smallest elastic coefficient but the largest number of effective turns.

When it is desired to increase the precompression, simply turn the turning knob 703 to drive the drive cylinder 704 and the preset barrel 702, so that the preset barrel 702 moves axially in the direction of compressing the helical spring 40. In the meantime, the rotatable element 30 moves axially and brings the stoppers 301 to closely press against the spring coils 401, so that the precompression applied to the effective turns of the helical spring 40 is increased.

The number of effective turns of the helical spring 40 may be decreased to increase the elastic coefficient thereof through the following adjusting steps:.

Step 1: Decrease the precompression to recover the coil pitch to the pitch of the rotatable element 30. This can be done by turning the turning knob 703 to drive the drive cylinder 704 and the preset barrel 702, so that the preset barrel 702 moves axially in a direction reverse to the direction of compressing the helical spring 40, and the rotatable element 30 moves axially at the same time to separate the stoppers 301 from the spring coils 401 with a small clearance existed between them.

Step 2: Decrease the number of effective turns of the helical spring 40. This can be done by turning the rotator knob 705 to drive the drive shaft 706 and the rotatable element 30, so that the rotatable element 30 rotates and moves axially in the direction of compressing the helical spring 40 until a preset number of turns is reached. In case the stoppers 301 on the rotatable element 30 are in contact with the spring coils 401 to prevent the rotatable element 30 from effectively rotating, go back to the step 1.

Step 3: Increase the precompression. This can be done in the manner as described earlier.

The number of effective turns of the helical spring 40 may be increased to decrease the elastic coefficient thereof through the following adjusting steps:

Step 1: Decrease the precompression to recover the coil pitch to the pitch of the rotatable element 30. This can be done in the manner as described earlier.

Step 2: Increase the number of effective turns of the helical spring 40. This can be done by turning the rotator knob 705 to drive the drive shaft 706 and the rotatable element 30, so that the rotatable element 30 rotates and moves axially in a direction reverse to the direction of compressing the helical spring 40 until a preset number of turns is reached. In case the stoppers 301 on the rotatable element 30 are in contact with the spring coils 401 to prevent the rotatable element 30 from effectively rotating, go back to the step 1.

Step 3: Increase the precompression. This can be done in the manner as described earlier.

When the male case has an inner diameter larger than the outer diameter of the female case, the adjusting mechanism 70 working with the externally grooved rotatable element 30 may still be operated in the above-describe manner to adjust the adjustable compression helical spring.

Figure 6:
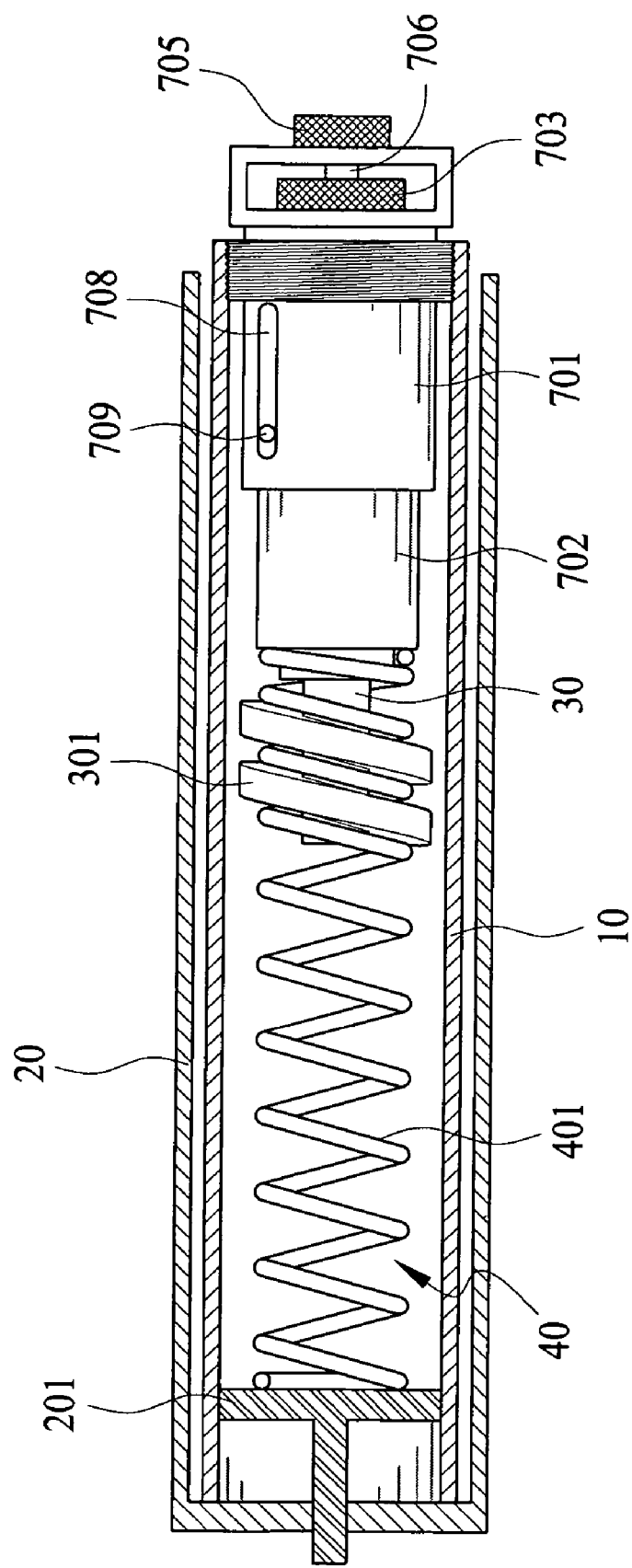
FIG. 6 shows the manner of using the adjusting mechanism of FIG. 1 to adjust an adjustable tension helical spring mounted in a male case having an outer diameter smaller than an inner diameter of a female case of the casing for the adjustable helical spring.

FIG. 6 shows the manner of using the adjusting mechanism 70 of FIG. 1 to work with an externally grooved rotatable element 30 to adjust an adjustable tension helical spring 40 mounted in a male case 10 having an outer diameter smaller than an inner diameter of a female case 20 of the casing for the adjustable helical spring. As shown, a tension stroke of the adjustable tension helical spring 40 is determined by the length of a locating seat 201. When a maximum tension stroke is reached, the male case 10 will contact at the second end with the locating seat 201. After the adjustable tension helical spring is assembled, the helical spring 40 is subjected to an initial pretension. This is the initial pretension applied to the male case 10 and the female case 20. A coil pitch formed under the initial pretension is an initial coil pitch. A distance difference between the initial coil pitch and a coil pitch not subjected to the initial pretension defines a specific range of the fatigue deformation of the helical spring 40. When the helical spring 40 is subjected to a fatigue deformation within an operating cycle thereof, and it is desired to recover the helical spring 40 to the initial coil pitch, a pretension less than the initial pretension is required. To effectively adjust the number of effective turns of the helical spring 40, the stoppers 301 on the rotatable element 30 and the pitch of the stoppers must be equal to or slightly larger than the initial coil pitch. In other words, an axial displacement produced by rotating the rotatable element 30 one turn must be equal to or slightly larger than the initial coil pitch.

The initial state of the adjusting mechanism 70 working with the externally grooved rotatable element 30 is as follows:

1. The retaining key 709 on the preset barrel 702 is located at the front end of the slot 708, so that a maximum axial displacement of the preset barrel 702 in a direction of tensioning the helical spring 40 may be obtained.

2. The stoppers 301 on the rotatable element 30 is in slight contact with the preset barrel 702, so that a maximum axial displacement of the rotatable element 30 in a direction reverse to the direction of tensioning the helical spring 40 may be obtained.

3. The stoppers 301 on the rotatable element 30 and the spring coils 401 of the helical spring 40 are separated from one another at where the stoppers 301 are pressed against the spring coils 401, and a small clearance is existed between the stoppers 301 and the spring coils 401.

The adjustable tension helical spring 40 in the initial state has the smallest elastic coefficient but the largest number of effective turns.

When it is desired to increase the pretension, simply turn the turning knob 703 to drive the drive cylinder 704 and the preset barrel 702, so that the preset barrel 702 moves axially in the direction of tensioning the helical spring 40. In the meantime, the rotatable element 30 moves axially and brings the stoppers 301 to closely press against the spring coils 401, so that the pretension applied to the effective turns of the helical spring 40 is increased.

The number of effective turns of the helical spring 40 may be decreased to increase the elastic coefficient thereof through the following adjusting steps:.

Step 1: Decrease the pretension to recover the coil pitch to the pitch of the rotatable element 30. This can be done by turning the turning knob 703 to drive the drive cylinder 704 and the preset barrel 702, so that the preset barrel 702 moves axially in a direction reverse to the direction of tensioning the helical spring 40, and the rotatable element 30 moves axially at the same time to separate the stoppers 301 from the spring coils 401 with a small clearance existed between them.

Step 2: Decrease the number of effective turns of the helical spring 40. This can be done by turning the rotator knob 705 to drive the drive shaft 706 and the rotatable element 30, so that the rotatable element 30 rotates and moves axially in a direction reverse to the direction of tensioning the helical spring 40 until a preset number of turns is reached. In case the stoppers 301 on the rotatable element 30 are in contact with the spring coils 401 to prevent the rotatable element 30 from effectively rotating, go back to the step 1.

Step 3: Increase the pretension. This can be done in the manner as described earlier.

The number of effective turns of the helical spring 40 may be increased to decrease the elastic coefficient thereof through the following adjusting steps:

Step 1: Decrease the pretension to recover the coil pitch to the pitch of the rotatable element 30. This can be done in the manner as described earlier.

Step 2: Increase the number of effective turns of the helical spring 40. This can be done by turning the rotator knob 705 to drive the drive shaft 706 and the rotatable element 30, so that the rotatable element 30 rotates and moves axially in the direction of tensioning the helical spring 40 until a preset number of turns is reached. In case the stoppers 301 on the rotatable element 30 are in contact with the spring coils 401 to prevent the rotatable element 30 from effectively rotating, go back to the step 1.

Step 3: Increase the pretension. This can be done in the manner as described earlier.

When the male case has an inner diameter larger than the outer diameter of the female case, the adjusting mechanism 70 working with the externally grooved rotatable element 30 may still be operated in the above-describe manner to adjust the adjustable tension helical spring.

FIG. 7 shows the manner of using the adjusting mechanism 80 of FIG. 4 to work with an internally grooved rotatable element 30 to adjust an adjustable compression helical spring 40 mounted in a male case 10 having an outer diameter smaller than an inner diameter of a female case 20 of the casing for the adjustable helical spring. As shown, a compression stroke of the adjustable compression helical spring 40 is determined by a range of axial displacement of the inner extractable tube 803 in the outer extractable tube 802. When a maximum compression stroke is reached, the second end of the inner extractable tube 803 contacts with the seal cap 805 at the first end of the outer extractable tube 802.

After the adjustable compression helical spring is assembled, the helical spring 40 is subjected to an initial precompression. This is the initial precompression applied to a location between the second end of the inner extractable tube 803 and the bearing 804 at the second end of the outer extractable tube 802. A coil pitch formed under the initial precompression is an initial coil pitch. A distance difference between the initial coil pitch and a coil pitch not subjected to the initial precompression defines a specific range of the fatigue deformation of the helical spring 40. When the helical spring 40 is subjected to a fatigue deformation within an operating cycle thereof, and it is desired to recover the helical spring 40 to the initial coil pitch, a precompression less than the initial precompression is required. To effectively adjust the number of effective turns of the helical spring 40, the stoppers 301 in the rotatable element 30 and the pitch of the stoppers must be equal to or slightly smaller than the initial coil pitch. In other words, an axial displacement produced by rotating the rotatable element 30 one turn must be equal to or slightly smaller than the initial coil pitch.

The initial state of the adjusting mechanism 80 working with the internally grooved rotatable element 30 is as follows:

1. The preset turning knob 801 is screwed to the first end of the outer extractable tube 802 closed by the seal cap 805, so that a maximum axial displacement of the preset turning knob 801 in the direction of compressing the helical spring 40 may be obtained.

2. The stoppers 301 in the rotatable element 30 is in slight contact with one end of the male case 10, so that a maximum axial displacement of the rotatable element 30 in the direction of compressing the helical spring 40 may be obtained.

3. The stoppers 301 in the rotatable element 30 and the spring coils 401 of the helical spring 40 are separated from one another at where the stoppers 301 are pressed against the spring coils 401, and a small clearance is existed between the stoppers 301 and the spring coils 401.

The adjustable compression helical spring 40 in the initial state has the smallest elastic coefficient but the largest number of effective turns.

When it is desired to increase the precompression, simply turn the preset turning knob 801 to drive the male case 10 and the rotatable element 30 to move axially in the direction of compressing the helical spring 40, causing the stoppers 301 in the rotatable element 30 to closely press against the spring coils 401, so that the precompression applied to the effective turns of the helical spring 40 is increased.

The number of effective turns of the helical spring 40 may be decreased to increase the elastic coefficient thereof through the following adjusting steps:

Step 1: Decrease the precompression to recover the coil pitch to the pitch of the rotatable element 30. This can be done by turning the preset turning knob 801 to drive the male case 10 and the rotatable element 30 to move axially in a direction reverse to the direction of compressing the helical spring 40, causing the stoppers 301 in the rotatable element 30 to separate from the spring coils 401 with a small clearance existed between them.

Step 2: Decrease the number of effective turns of the helical spring 40. This can be done by turning the rotatable element 30, so that the rotatable element 30 rotates and moves axially in the direction of compressing the helical spring 40 until a preset number of turns is reached. In case the stoppers 301 in the rotatable element 30 are in contact with the spring coils 401 to prevent the rotatable element 30 from effectively rotating, go back to the step 1.

Step 3: Increase the precompression. This can be done in the manner as described earlier.

The number of effective turns of the helical spring 40 may be increased to decrease the elastic coefficient thereof through the following adjusting steps:

Step 1: Decrease the precompression to recover the coil pitch to the pitch of the rotatable element 30. This can be done in the manner as described earlier.

Step 2: Increase the number of effective turns of the helical spring 40. This can be done by turning the rotatable element 30, so that the rotatable element 30 rotates and moves axially in a direction reverse to the direction of compressing the helical spring 40 until a preset number of turns is reached. In case the stoppers 301 on the rotatable element 30 are in contact with the spring coils 401 to prevent the rotatable element 30 from effectively rotating, go back to the step 1.

Step 3: Increase the precompression. This can be done in the manner as described earlier.

When the male case 10 has an inner diameter larger than the outer diameter of the female case 20, the adjusting mechanism 80 working with the internally grooved rotatable element 30 may still be operated in the above-describe manner to adjust the adjustable compression helical spring.

FIG. 8 shows the manner of using the adjusting mechanism 80 of FIG. 4 to work with an internally grooved rotatable element 30 to adjust an adjustable tension helical spring 40 mounted in a male case 10 having an outer diameter smaller than an inner diameter of a female case 20 of the casing for the adjustable helical spring. As shown, a tension stroke of the adjustable tension helical spring 40 is determined by a range of axial displacement of the inner extractable tube 803 in the outer extractable tube 802. When a maximum tension stroke is reached, the second end of the inner extractable tube 803 contacts with the bearing 804 at the second end of the outer extractable tube 802. After the adjustable tension helical spring is assembled, the helical spring 40 is subjected to an initial pretension. This is the initial pretension applied to a location between the second end of the inner extractable tube 803 and the seal cap 805 at the first end of the outer extractable tube 802. A coil pitch formed under the initial pretension is an initial coil pitch. A distance difference between the initial coil pitch and a coil pitch not subjected to the initial pretension defines a specific range of the fatigue deformation of the helical spring 40. When the helical spring 40 is subjected to a fatigue deformation within an operating cycle thereof, and it is desired to recover the helical spring 40 to the initial coil pitch, a pretension less than the initial pretension is required. To effectively adjust the number of effective turns of the helical spring 40, the stoppers 301 in the rotatable element 30 and the pitch of the stoppers must be equal to or slightly larger than the initial coil pitch. In other words, an axial displacement produced by rotating the rotatable element 30 one turn must be equal to or slightly larger than the initial coil pitch.

The initial state of the adjusting mechanism 80 working with the internally grooved rotatable element 30 is as follows:

The preset turning knob 801 is screwed to the first end of the outer extractable tube 802 closed by the seal cap 805, so that a maximum axial displacement of the preset turning knob 801 in the direction of tensioning the helical spring 40 may be obtained.

The stoppers 301 in the rotatable element 30 is in slight contact with one end of the male case 10, so that a maximum axial displacement of the rotatable element 30 in a direction reverse to the direction of tensioning the helical spring 40 may be obtained.

The stoppers 301 in the rotatable element 30 and the spring coils 401 of the helical spring 40 are separated from one another at where the stoppers 301 are pressed against the spring coils 401, and a small clearance is existed between the stoppers 301 and the spring coils 401.

The adjustable tension helical spring 40 in the initial state has the smallest elastic coefficient but the largest number of effective turns.

When it is desired to increase the pretension, simply turn the preset turning knob 801 to drive the male case 10 and the rotatable element 30 to move axially in the direction of tensioning the helical spring 40, causing the stoppers 301 in the rotatable element 30 to closely press against the spring coils 401, so that the pretension applied to the effective turns of the helical spring 40 is increased.

The number of effective turns of the helical spring 40 may be decreased to increase the elastic coefficient thereof through the following adjusting steps:

Step 1: Decrease the pretension to recover the coil pitch to the pitch of the rotatable element 30. This can be done by turning the preset turning knob 801 to drive the male case 10 and the rotatable element 30 to move axially in a direction reverse to the direction of tensioning the helical spring 40, causing the stoppers 301 in the rotatable element 30 to separate from the spring coils 401 with a small clearance existed between them.

Step 2: Decrease the number of effective turns of the helical spring 40. This can be done by turning the rotatable element 30, so that the rotatable element 30 rotates and moves axially in a direction reverse to the direction of tensioning the helical spring 40 until a preset number of turns is reached. In case the stoppers 301 in the rotatable element 30 are in contact with the spring coils 401 to prevent the rotatable element 30 from effectively rotating, go back to the step 1.

Step 3: Increase the pretension. This can be done in the manner as described earlier.

The number of effective turns of the helical spring 40 may be increased to decrease the elastic coefficient thereof through the following adjusting steps:

Step 1: Decrease the pretension to recover the coil pitch to the pitch of the rotatable element 30. This can be done in the manner as described earlier.

Step 2: Increase the number of effective turns of the helical spring 40. This can be done by turning the rotatable element 30, so that the rotatable element 30 rotates and moves axially in the direction of tensioning the helical spring 40 until a preset number of turns is reached. In case the stoppers 301 on the rotatable element 30 are in contact with the spring coils 401 to prevent the rotatable element 30 from effectively rotating, go back to the step 1.

Step 3: Increase the pretension. This can be done in the manner as described earlier.

When the male case 10 has an inner diameter larger than the outer diameter of the female case 20, the adjusting mechanism 80 working with the internally grooved rotatable element 30 may still be operated in the above-describe manner to adjust the adjustable tension helical spring.

The invention claimed is:

1. An adjusting mechanism for remedying a coil pitch tolerance and fatigue deformation of an adjustable helical spring through working with an externally grooved rotatable element, said adjustable helical spring being mounted in a casing consisting of a male and a female case, and having an end connected to said rotatable element, comprising a fixing case, a preset barrel, a turning knob, a drive cylinder, a rotator knob, a drive shaft, a spacer, and a retaining key;

said fixing case being a hollow case having a central hole formed at a bottom end, said bottom central hole having an inner diameter smaller than that of a front end of said fixing case opposite to said bottom end; said fixing case being provided at a predetermined position near said bottom central hole with first external threads to mesh with internal threads provided in an open end of said male case of said adjustable helical spring, so as to fixedly connect said whole adjusting mechanism to said casing for said adjustable helical spring; said fixing case being provided with an axial slot of a predetermined length, said axial slot having a bottom end close to said bottom end of said fixing case, and a front end opposite to said bottom end; said fixing case also being provided around said bottom end with second threads;

said preset barrel being a hollow member with internal threads provided in a first end to mesh with external threads provided on said drive cylinder, and in an opposite second end to mesh with external threads on said rotatable element; said helical spring being connected at an end to an outer peripheral surface of said second end of said preset barrel;

said retaining key being mounted at a predetermined position on the outer peripheral surface of said preset barrel and guided by said slot on said fixing case to axially move said preset barrel;

said drive cylinder being a hollow member with a first end extended through said bottom central hole of said fixing case to tightly engage with said turning knob, and an opposite second end provided with external threads to mesh with said internal threads in the first end of said preset barrel;

said turning knob being manually operable for adjusting precompression or pretension of said helical spring, and being located at an outer side of said bottom central hole of said fixing case to tightly engage with said drive cylinder; whereby said turning knob is smoothly turnable relative to said fixing case to rotate said drive cylinder; said drive cylinder rotated by said turning knob and said retaining key on said preset barrel and guided by said slot on said fixing case together causing said preset barrel to move axially;

said spacer being an internally threaded member screwed to said second external threads of said fixing case;

said drive shaft having a first end extended through said bottom central hole of said fixing case and a central hole on said spacer to tightly engage with said rotator knob, and an opposite second end having axially extended drive keys spaced on an outer surface thereof to slidably fit in an axial keyway provided on said rotatable element; and said rotator knob being manually turnable for adjusting the number of effective turns of said helical spring, and being located at an outer side of said spacer to tightly engage with the first end of said drive shaft; whereby said rotator knob is smoothly turnable relative to said spacer to rotate said drive shaft and, accordingly, said rotatable element, which is connected to said drive shaft via engagement of said axial keyway on said rotatable element with said axial drive keys on said drive shaft; and said rotatable element is brought to turn and axially move at the same time due to said retaining key on said preset barrel and the engagement of said external threads on said rotatable element with said internal threads in said second end of said preset barrel.

2. An adjusting method for remedying a coil pitch tolerance and fatigue deformation of an adjustable helical spring, comprising the steps of:

preparing an adjusting mechanism that is mounted at an end of a casing for said adjustable helical spring, so that a rotatable element mounted in said casing for said adjustable helical spring to connect to an end of said helical spring is turnable and axially movable via said adjusting mechanism;

setting said adjustable helical spring and said adjusting mechanism to an initial state, in which coils of said helical spring and stoppers on said rotatable element are separated from one another at where said stoppers of said rotatable element closely press against said spring coils, and a small clearance exists between said coils of said helical spring and said stoppers on said rotatable element, so that a maximum adjusting range for the precompression or pretension of said helical spring and a maximum adjusting range for the number of effective turns of said helical spring may be obtained;

changing (including increasing or decreasing) the number of effective turns of said adjustable helical spring in the following steps:

changing the precompression or the pretension of said helical spring using said adjusting mechanism, so that said helical spring is recovered to a coil pitch the same as that of said rotatable element, and said stoppers on said rotatable element and said spring coils are separated from one another at where said stoppers of said rotatable element press against said spring coils with a small clearance existed between them;

turning said rotatable element to obtain the number of effective turns preset for said helical spring; and return to Step 1 in case said stoppers of said rotatable element are in contact with said spring coils to prevent said rotatable element from rotating effectively; and using said adjusting mechanism to increase the precompression or the pretension of said adjustable helical spring, causing said stoppers of said rotatable element to closely press against said spring coils of said helical spring.

3. The adjusting method for remedying the coil pitch tolerance and fatigue deformation of an adjustable helical spring as claimed in claim 2, wherein said rotatable element working with said adjusting mechanism is either externally grooved or internally grooved to connect with said helical spring.

4. The adjusting method for remedying the coil pitch tolerance and fatigue deformation of an adjustable helical spring as claimed in claim 2, wherein said adjustable helical spring is an adjustable compression helical spring and said rotatable element working with said adjusting mechanism is externally grooved to connect with said helical spring.

5. The adjusting method for remedying the coil pitch tolerance and fatigue deformation of an adjustable helical spring as claimed in claim 2, wherein said adjustable helical spring is an adjustable tension helical spring and said rotatable element working with said adjusting mechanism is externally grooved to connect with said helical spring.

6. The adjusting method for remedying the coil pitch tolerance and fatigue deformation of an adjustable helical spring as claimed in claim 2, wherein said adjustable helical spring is an adjustable compression helical spring and said rotatable element working with said adjusting mechanism is internally grooved to connect with said helical spring.

7. The adjusting method for remedying the coil pitch tolerance and fatigue deformation of an adjustable helical spring as claimed in claim 2, wherein adjustable helical spring is an adjustable tension helical spring and said rotatable element working with said adjusting mechanism is internally grooved to connect with said helical spring.

8. The adjusting method for remedying the coil pitch tolerance and fatigue deformation of an adjustable helical spring as claimed in claim 2, wherein said adjustable helical spring is an adjustable compression helical spring, and wherein said step of changing (increasing or decreasing) the number of effective turns of said adjustable helical spring further comprises the step of adjusting the coil pitch of said rotatable element, so that an axial displacement of coil pitch produced by rotating said stoppers of said rotatable element one turn is equal to or slightly less than an initial coil pitch.

9. The adjusting method for remedying the coil pitch tolerance and fatigue deformation of an adjustable helical spring as claimed in claim 2, wherein said adjustable helical spring is an adjustable tension helical spring, and wherein said step of changing (increasing or decreasing) the number of effective turns of said adjustable helical spring further comprises the step of adjusting the coil pitch of said rotatable element, so that an axial displacement of coil pitch produced by rotating said stoppers of said rotatable element one turn is equal to or slightly larger than an initial coil pitch.

10. The adjusting method for remedying the coil pitch tolerance and fatigue deformation of an adjustable helical spring as claimed in claim 8, wherein said initial coil pitch is a coil pitch determined by an initial precompression, and a distance difference between said initial coil pitch and a coil pitch not subjected to the initial precompression defines a specific range of fatigue deformation of said helical spring.

11. The adjusting method for remedying the coil pitch tolerance and fatigue deformation of an adjustable helical spring as claimed in claim 9, wherein said initial coil pitch is a coil pitch determined by an initial pretension, and a distance difference between said initial coil pitch and a coil pitch not subjected to the initial pretension defines a specific range of fatigue deformation of said helical spring.

12. The adjusting method for remedying the coil pitch tolerance and fatigue deformation of an adjustable helical spring as claimed in claim 2, wherein said step of increasing the precompression further comprises the step of turning a turning knob of said adjusting mechanism to drive said rotatable element to move axially in a direction of compressing said helical spring, so that said stoppers of said rotatable element are brought to closely contact with said spring coils to increase the precompression applied to the effective coils of said helical spring.

13. The adjusting method for remedying the coil pitch tolerance and fatigue deformation of an adjustable helical spring as claimed in claim 2, wherein said step of increasing pretension further comprises the step of a turning knob of said adjusting mechanism to drive said rotatable element to move axially in a direction of tensioning said helical spring, so that said stoppers of said rotatable element are brought to closely contact with said spring coils to increase the pretension applied to the effective coils of said helical spring.

* * * * *